(12) United States Patent
Yoneda

(10) Patent No.: US 7,284,577 B2
(45) Date of Patent: Oct. 23, 2007

(54) CONTAINER CONTROL APPARATUS AND MANUFACTURE-RELATED PLANT

(75) Inventor: Takahiro Yoneda, Nishinomiya (JP)

(73) Assignee: Asahi Breweries Ltd., Tokyo (JP)

( * ) Notice: Subject to any disclaimer, the term of this patent is extended or adjusted under 35 U.S.C. 154(b) by 0 days.

(21) Appl. No.: 11/404,914

(22) Filed: Apr. 14, 2006

(65) Prior Publication Data

US 2006/0191591 A1 Aug. 31, 2006

Related U.S. Application Data

(63) Continuation of application No. PCT/JP2004/008346, filed on Jun. 15, 2004.

(30) Foreign Application Priority Data

Oct. 17, 2003 (JP) .............................. 2003-357852

(51) Int. Cl.
  B67C 3/02 (2006.01)
  B65B 57/04 (2006.01)
  B65G 47/26 (2006.01)
  B65G 33/30 (2006.01)

(52) U.S. Cl. .............................. 141/129; 53/67; 53/77; 53/250; 141/144; 141/155; 198/459.3; 198/467.1; 198/657

(58) Field of Classification Search .................... 53/64, 53/67, 69, 70, 249–251, 253, 77; 141/129, 141/144, 155, 180; 198/459.2, 459.3, 467.1, 198/550.6, 625, 657

See application file for complete search history.

(56) References Cited

U.S. PATENT DOCUMENTS 3,129,544 A * 4/1964 Klapes et al. .................. 53/64
3,139,713 A * 7/1964 Merrill et al. ................. 53/64
RE29,482 E * 11/1977 Rosen ......................... 141/180
4,429,512 A * 2/1984 Pegon, Jr. ..................... 53/251
4,605,047 A * 8/1986 Bausch et al. .............. 198/625
4,660,708 A * 4/1987 Willerding ............... 198/467.1
2002/0139436 A1* 10/2002 Rosen et al. ................. 141/129

FOREIGN PATENT DOCUMENTS

| JP | 64-75319 A | * | 3/1989 |
| JP | 6-9047 A | * | 1/1994 |
| JP | 08-034517 | | 6/1996 |
| JP | 08-231041 | | 10/1996 |
| JP | 11-167731 | | 6/1999 |
| JP | 2000-159329 | | 6/2000 |

* cited by examiner

OTHER PUBLICATIONS

International Search Report dated Oct. 5, 2004 (PCT/JP2004/008346).

*Primary Examiner*—Stephen F Gerrity
(74) *Attorney, Agent, or Firm*—Milbank, Tweed, Hadley & McCloy LLP

(57) ABSTRACT

Damage or deformation of a container in a processing device downstream a convey path is prevented. A filling device includes a filling unit (1), star wheel (2), and timing screw (3). Containers (10) are supplied to the timing screw (3) by a conveyor (6) along a convey path. A container control apparatus includes a control member (11) which controls supply and stop of the containers (10) before the timing screw (3), a driving unit (13) which drives the control member (11), and a sensor (35) which detects a state of the timing screw (3) such as a rotation angle. When the containers (10) are to be stopped, the driving unit (13) controls the control member (11) under the control of a control unit (30) to stop the containers (10) in accordance with a detection result of the sensor (35).

9 Claims, 8 Drawing Sheets

CONTAINER CONTROL APPARATUS AND MANUFACTURE-RELATED PLANT

CROSS-REFERENCE TO RELATED APPLICATIONS

This application is a continuation of and claims priority to International Application PCT/JP2004/008346, with an international filing date of Jun. 15, 2004, which in turn claims priority to Japanese application 2003-357852 filed on Oct. 17, 2003; the entire disclosures of which are all incorporated by reference herein.

TECHNICAL FIELD

The present invention relates to a container control apparatus and manufacture-related plant and, more particularly, to a container control apparatus for controlling conveyance of containers and a manufacture-related plant including the container control apparatus.

BACKGROUND ART

A filling device (filler) fills cans with a liquid such as beer. The cans are supplied to the filling device by a conveyor (convey device) along a convey path. Supply of the cans to the filling device is performed and stopped by a can control apparatus arranged on the convey path.

FIG. 1 is a view schematically showing a conventional filling device and can control apparatus. Cans 10 are continuously conveyed by a conveyor 6 along a convey path while they are guided by guide members 4a and 4b. A timing screw 3 and star wheel 2 rotate in synchronism with a filling unit 1. The timing screw 3 has a helical engaging portion (when expressed from between engaging portions) formed on its entire circumference to engage with the side surfaces of cylindrical cans 10. When the cans 10 reach near the upstream end portion of the timing screw 3, they engage with the helical engaging portion and are conveyed toward the star wheel 2 as the timing screw 3 rotates. At this time, the timing screw 3 and star wheel 2 are synchronized so that the cans 10 are transferred into semicircular recessed engaging portions in the star wheel 2.

When supply of the cans 10 to the timing screw 3 (filling unit 1) must be stopped, the cans 10 are sandwiched by a pair of opposing stopper members (can control apparatus) 5a and 5b, so that conveyance of the cans 10 can be forcibly stopped. In this state, typically, the conveyor 6 operates continuously. Hence, a frictional force acts on the cans 10 which are stopped as they are sandwiched by the stopper members 5a and 5b, and cans 10 which follow them.

When supply of the cans 10 to the timing screw 3 (filling unit 1) is to be resumed (started), restriction or interception of the cans 10 by the pair of opposing stopper members 5a and 5b may be canceled. Then, the cans 10 start moving by the conveyor 6 again toward the downstream timing screw 3 along the convey path.

In addition to the mechanism in which both the stopper members 5a and 5b are pushed toward the cans 10 to sandwich them, another mechanism is also available in which only one stopper member is pushed toward the cans 10 to sandwich them.

The conventional can stopping apparatus as described above has various problems, and typical ones will be described hereinafter.

Conventionally, the stopper members 5a and 5b are driven regardless of the positions of the cans 10, and sandwich the cans 10 to stop them. Accordingly, as shown in, e.g., FIG. 2, if the stopper members 5a and 5b are not operated at a good timing and sandwich a leading can 10a insufficiently, the leading can 10a may sometimes move through downward, i.e., toward the timing screw 3 by the movement of the conveyor 6.

The leading can 10a is conveyed toward the timing screw 3 with a distance being formed from a preceding can 10b. The distance depends on various types of parameters, e.g., the positional relationship between the can 10a and the stoppers 5a and 5b when the stoppers 5a and 5b are operated, the convey speed of the conveyor 6, and the frictional force between the conveyor 6 and can 10a, and is accordingly unpredictable and changes each time.

When the can 10a is to slip out from the stopper members 5a and 5b, if it is inclined, as shown in FIG. 3, it is sometimes supplied to the timing screw 3 in a swaying state.

As described above, the can 10a slipping out from the stopper members 5a and 5b can be supplied to the timing screw 3 at a wrong timing because the distance between the can 10a and the preceding can 10b is not maintained at a predetermined distance (for example, an integer multiple of the diameter of the can 10). Then, as schematically shown in FIG. 4, the helical tooth portion formed on the timing screw 3 may bite into the trunk of the can 10a to deform or break the can 10a. If the can 10a is broken to leave its pieces on the convey path, the pieces can damage or dent the subsequent cans, or enter the timing screw 3 or a mechanism downstream of it to cause operation errors.

Similarly, when the can 10a is supplied to the timing screw 3 in a swaying state, it may be deformed or broken. When the sway of the can 10a is large, the can 10a may fall. When the can 10a falls over, it may be supplied to the timing screw 3 in a lying state to cause operation errors of the timing screw 3.

DISCLOSURE OF INVENTION

Problems that the Invention is to Solve

The present invention has been made in view of the above problems, and has as its object to reliably stop a container, e.g., a can, under conveyance.

Means of Solving the Problems

According to the first aspect of the present invention, there is provided a container control apparatus for controlling conveyance of containers, comprising a control member to control supply and stop of the containers to a processing device, which sequentially receives the containers, being continuously conveyed by a convey device along a convey path, by a timing screw having a helical engaging portion before the timing screw, a driving unit which drives the control member, and a detection unit which detects a state of the timing screw. The driving unit drives the control member so as to stop the containers, which are being continuously conveyed along the convey path, in accordance with a detection result of the detection unit. When the control member is driven in accordance with the state of the timing screw in this manner, the containers being conveyed to the timing screw along the convey path can be stopped reliably.

According to a preferred embodiment of the present invention, the control member can have a tooth portion to be inserted between the containers. With the tooth portion, the containers under conveyance can be stopped more reliably. The driving unit preferably drives the control member in accordance with the detection result of the detection unit at a timing when the tooth portion is inserted between the containers which are being continuously conveyed along the convey path, to stop the containers. This can prevent the tooth portion from biting into the trunks or the like of the containers, thereby preventing damage or deformation of the container.

According to another preferred embodiment of the present invention, the control member has a helical engaging portion in part of a side surface thereof to engage with the containers, and is arranged to be pivotal about an axis substantially parallel to the convey path of the containers as the center, and the driving unit pivots the control member about the axis as the center to control conveyance and stop of the containers. With this structure, the containers can be stopped reliably and comparatively moderately. When the containers are to be stopped, the driving unit preferably pivots the control member, in accordance with the detection result of the detection unit, at a timing when the tooth portion between the engaging portions is inserted between the containers which are being continuously conveyed along the convey path. This can prevent the tooth portion from biting into the trunks or the like of the containers, thereby preventing damage or deformation of the container. When conveyance of the containers by the convey device is to be allowed, the driving unit pivots the control member such that, of the side surface of the control member, a portion where the helical engaging portion is not formed faces a side portion of the convey path, and when conveyance of the containers by the convey device is to be interfered with, the driving unit pivots the control member such that the helical engaging portion engages with the containers, and stops the control member still in this state, thereby stopping the containers.

According to still another preferred embodiment of the present invention, the control member can include a member which sandwiches the containers from two sides to stop the containers and releases the containers, thereby resuming supply of the containers.

According to still another preferred embodiment of the present invention, the control member can include a member which closes the convey path to stop the containers and opens the convey path to resume supply of the containers.

In a preferred application of the present invention, the processing device can include a filling device which fills the containers with a liquid.

According to still another preferred embodiment of the present invention, the detection unit can detect a rotation angle of, e.g., the timing screw. Alternatively, the detection unit can detect, as information indicating a state of the timing screw, information related to a position of a container engaging with the engaging portion of the timing screw. A position of a container which moves beside a side portion of the control member along the convey path is specified by the information.

According to still another preferred embodiment of the present invention, the containers which are conveyed continuously along the convey path continue tightly from a position of an inlet of the timing screw to the side portion of the control member.

According to still another preferred embodiment of the present invention, the control unit preferably includes a delay unit which delays a detection signal from the detection unit to supply a driving signal to the driving unit. The delay unit can preferably adjust a time to delay the detection signal. With this structure, the timing to drive the control member can be adjusted easily, and the timing can be adjusted when necessary.

According to the second aspect of the present invention, there is provided a manufacture-related plant which deals with containers, comprising a processing device which has a timing screw formed with a helical engaging portion to receive the containers continuously conveyed by a convey device along a convey path, a control member to control supply and stop of the containers to the timing screw of the processing device before the timing screw, a driving unit which drives the control member, and a detection unit which detects a state of the timing screw, wherein the driving unit drives the control member to stop the containers, which are being continuously conveyed along the convey path, in accordance with a detection result of the detection unit. When the control member is driven in accordance with the state of the timing screw in this manner, the containers which are being conveyed to the timing screw along the convey path can be stopped reliably.

According to a preferred application of the present invention, the processing device can include a filling device which fills the containers with a liquid.

Effect of the Invention

According to the present invention, for example, the containers under conveyance can be stopped reliably. Therefore, the containers can be prevented from being supplied to a downward processing device on the convey path at an inappropriate timing to be broken or deformed.

DESCRIPTION OF THE REFERENCE NUMERALS

Figure 1:
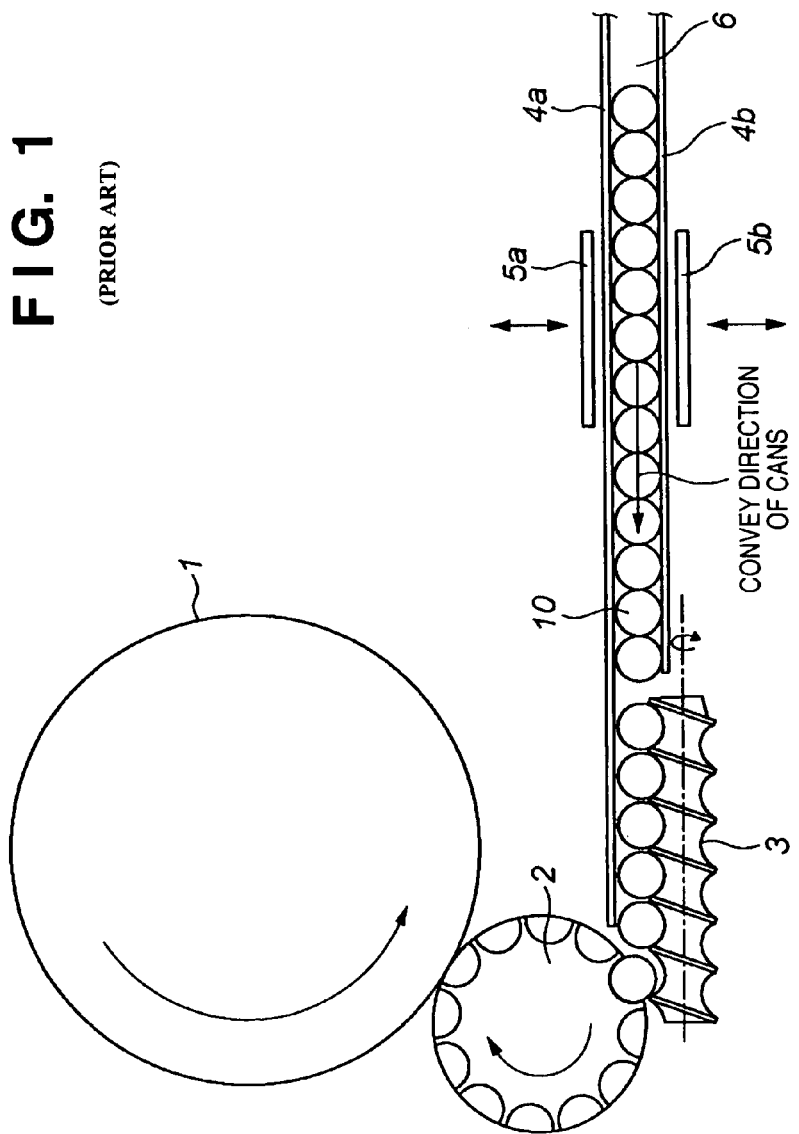
FIG. 1 is a view schematically showing a conventional filling device and can control apparatus.
Figure 2:
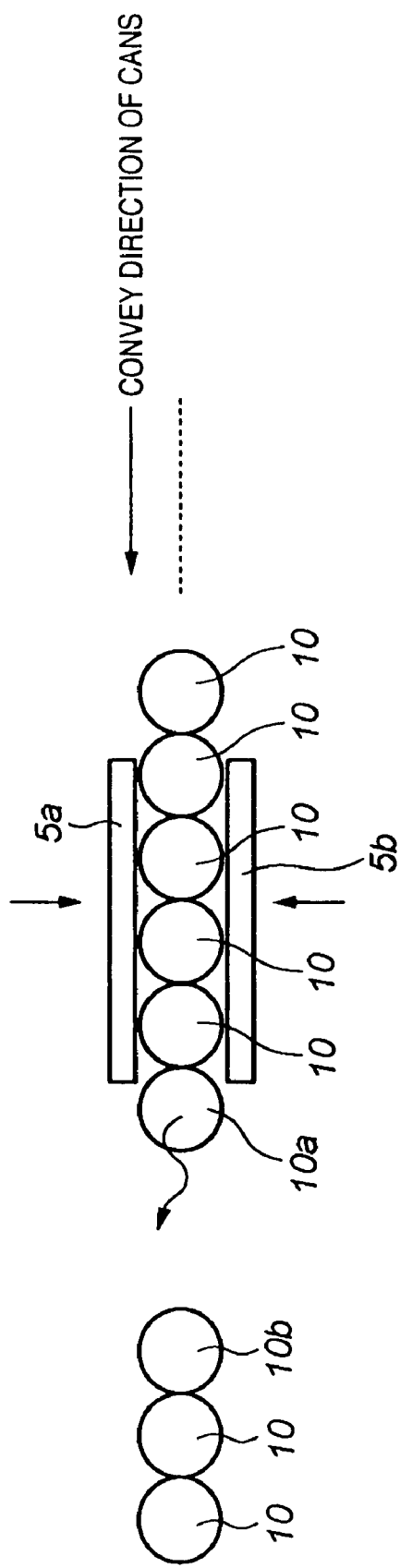
FIG. 2 is a view schematically showing how cans slip out from stopper members.
Figure 3:
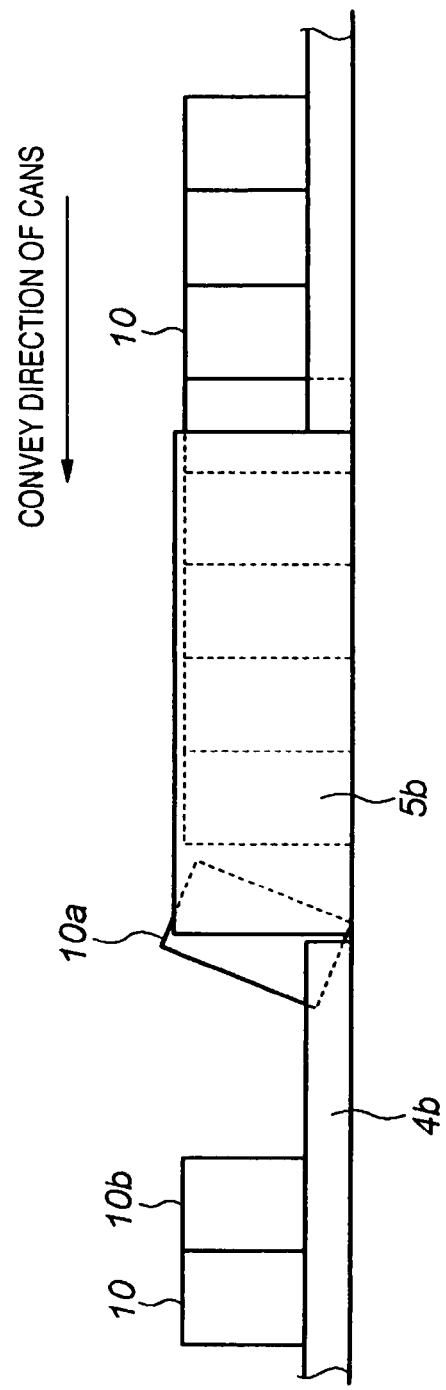
FIG. 3 is a view schematically showing how the cans slip out from the stopper members.
Figure 4:
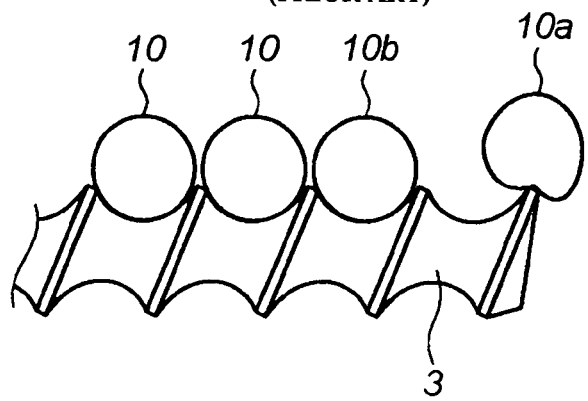
FIG. 4 is a view schematically showing problems that can occur when a can slipping out from the stopper members is supplied to a timing screw.

1: filling unit
2: star wheel
3: timing screw
3m: detection target portion
3s: rotating shaft 3s
4a, 4b: guide member 5a, 5b: stopper member
6: conveyor (convey path)
10, 10a, 10b: can
10g: gap between cans
11: control member
11a: shaft
11p: convey guide surface
11r: groove
11t: tooth portion (projection)
12: detection unit (e.g., rotary encoder)
13: driving unit (e.g., stepping motor)
15: detection unit (e.g., rotary encoder)
16: motor
20: sensor
30: control unit
31: delay unit
35: sensor
38: bite detection sensor
41a, 41b: stopper member
41c, 41d: slipping out preventive portion
42a, 42b: driving unit (e.g., air cylinder, linear motor)
51: stopper member
52: driving unit (e.g., air cylinder, linear motor)

BEST MODE FOR CARRYING OUT THE INVENTION

A preferred embodiment of the present invention will be described with reference to the accompanying drawings.

In the following description, a case will be described wherein a container control apparatus according to the present invention is applied to an apparatus which controls conveyance and stop of cans. The present invention can also be applied to an apparatus which controls conveyance and stop of containers (e.g., bottles or PET bottles) other than cans. In the following description, the container control apparatus is arranged on a convey path to supply cans to a filling device which fills the cans with a liquid such as beer. The present invention can also be arranged on a convey path to supply containers to processing devices (e.g., a labeling device which adheres labels to containers such as bottles, an inspection device which tests containers such as cans or bottles, and the like) other than the filling device.

Figure 5:
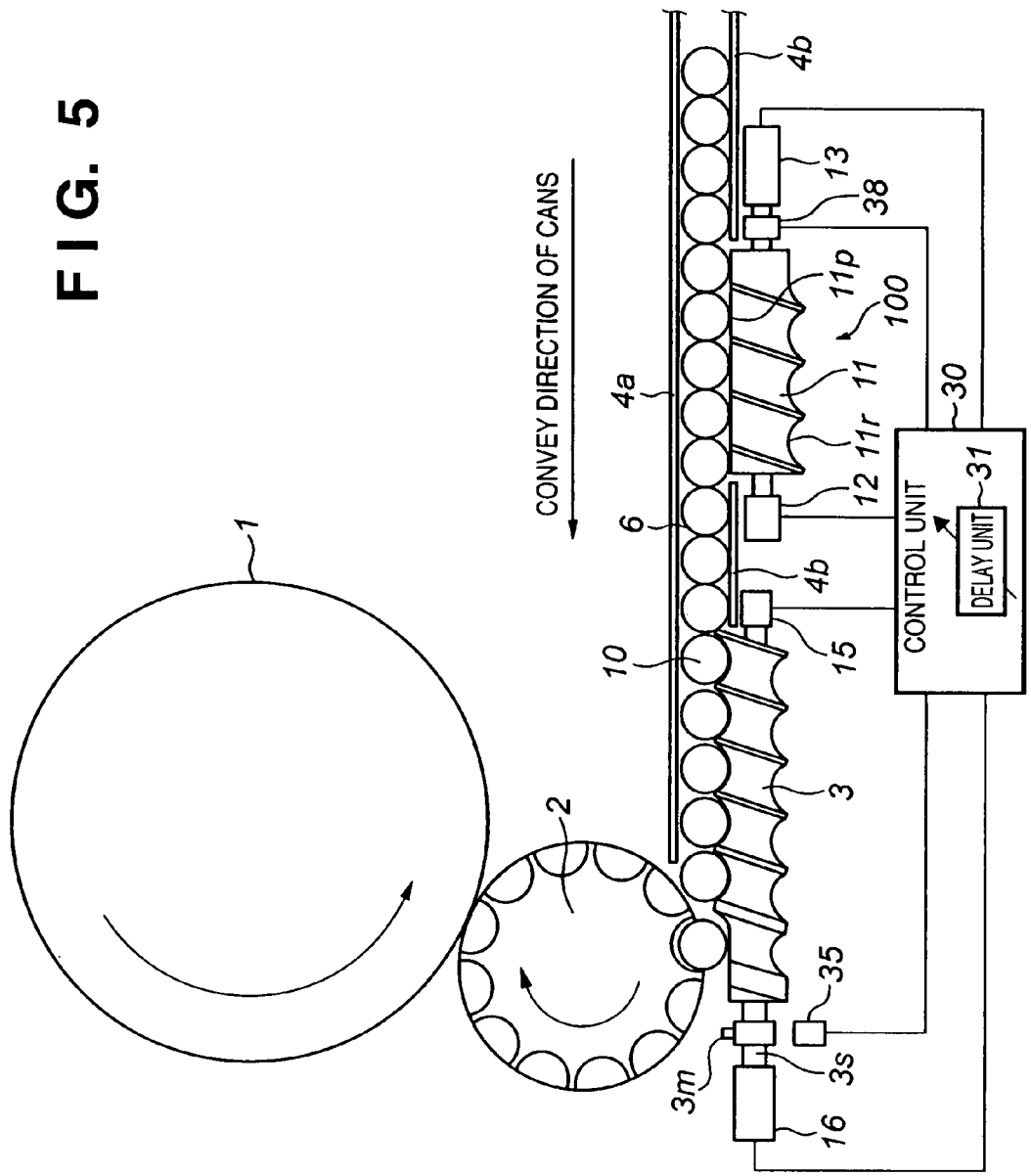
FIG. 5 is a view showing a manufacture-related plant (when cans are being supplied) according to a preferred embodiment of the present invention.
Figure 6:
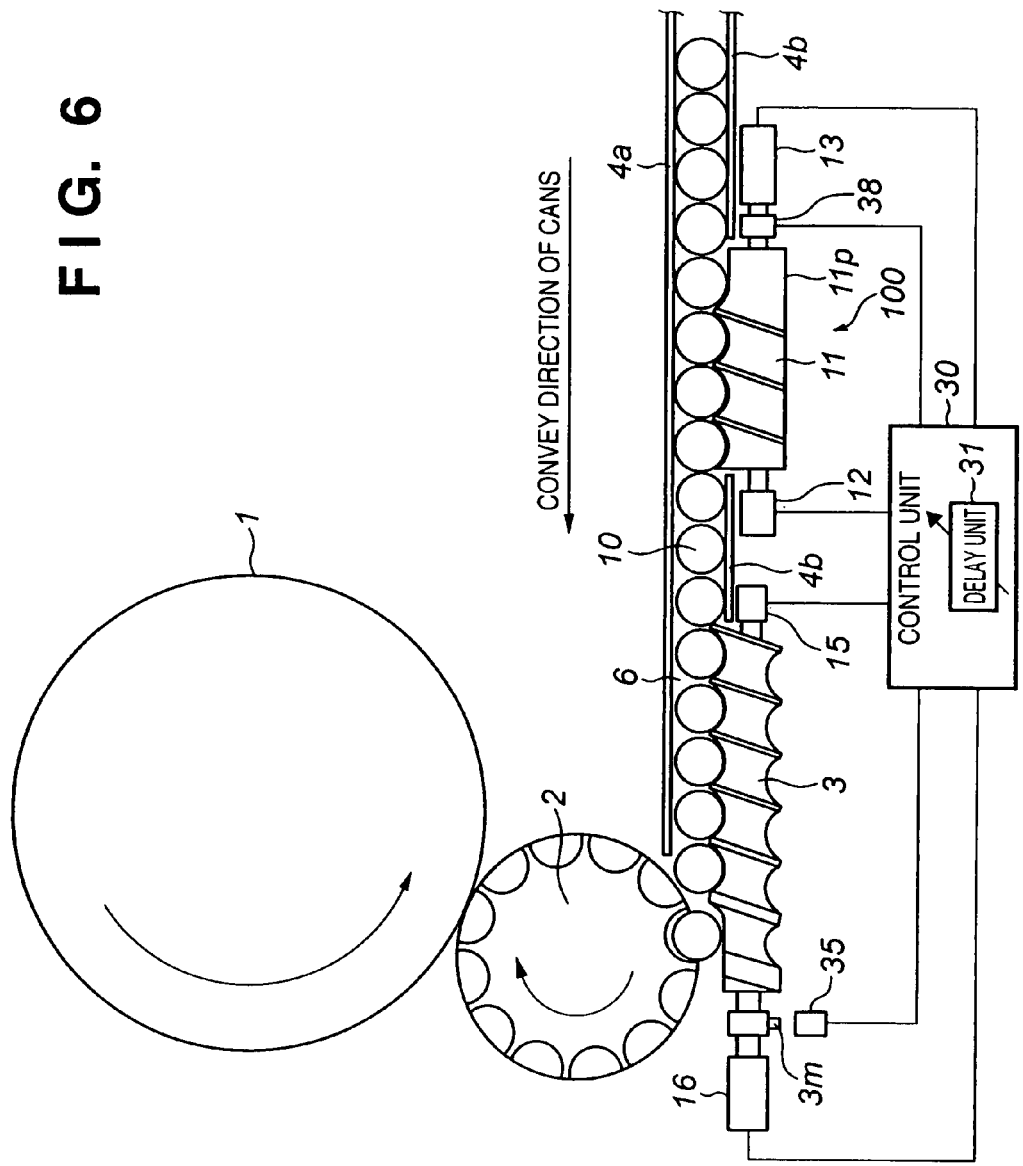
FIG. 6 is a view showing the manufacture-related plant (when the cans are stopped) according to the preferred embodiment of the present invention.

FIGS. 5 and 6 are views showing a container control apparatus according to a preferred embodiment of the present invention and its application (a manufacture-related plant which fills cans with a liquid such as beer). FIG. 5 shows a state wherein cans are supplied to a filling device, and FIG. 6 shows a state wherein supply of the cans to the filling device is stopped by the container control apparatus.

According to this embodiment, a container control apparatus 100 is arranged on a convey path which conveys cans to the filling device for filling cans 10 with a liquid such as beer. The filling device includes, e.g., a filling unit 1, star wheel 2, timing screw 3, and the like.

The cans 10 are continuously conveyed by a conveyor 6 along a convey path (a portion denoted by reference numeral "6") while they are guided by guide members 4a and 4b, or the like. The timing screw 3 and star wheel 2 rotate in synchronism with the filling unit 1 which fills the cans 10 with the liquid. The timing screw 3 rotatably driven by a motor 16 has a helical engaging portion (when expressed from another point of view, a tooth portion or projection between engaging portions) formed on throughout its entire surface to engage with the side surfaces (trunk portions) of the cylindrical cans 10. When the cans 10 reach near the upstream end portion (inlet) of the timing screw 3, they engage with the helical engaging portion and are conveyed toward the star wheel 2 as the timing screw 3 rotates. At this time, the timing screw 3 and star wheel 2 are synchronized so that the cans 10 are transferred into semi-cylindrical recessed engaging portions in the star wheel 2.

When the cans 10 are to be supplied to the timing screw 3 (filling unit 1) along the convey path, a semi-screw-shaped control member 11 of the container control apparatus 100 is pivoted by a driving unit (e.g., a stepping motor) 13 such that the control member 11 will not interfere with the conveyance of the cans 10 by the conveyor 6, that is, that surface (convey guide surface) 11p of the control member 11 where no helical engaging portion 11r is formed faces the convey path (or the trunk portions of the cans 10), as shown in FIG. 5, and this state is maintained. In this state, the control member 11 can serve as a guide member which guides conveyance of the cans 10.

When supply of the cans 10 to the timing screw 3 (filling unit 1) must be stopped, the semi-screw-shaped control member 11 is typically pivoted through 180° by the driving unit 13 such that the helical engaging portion 11r of the control member 11 engages with the cylindrical surfaces of the cans 10. FIG. 6 shows a state wherein the control member 11 in the state shown in FIG. 5 is pivoted through 180°.

The pivot operation of the control member 11 by the driving unit 13 is controlled such that the toothed portion or projection between the helical engaging portions 11r of the control member 11 is inserted between the cans 10 under conveyance, that is, such that the surface of the engaging portion matches the cylindrical surfaces of the cans. At this time, the movement in the convey direction of the cans 10 to be stopped is regulated by the helical tooth portion formed on the control member 11. Unless the driving unit 13 restores the control member 11 to a conveyance enabled state upon reception of a command for resumption (start) of conveyance of the cans 10, the cans 10 do not slip out from the control member 11 to move downstream.

Along with this pivot operation, the cans 10 in the convey state (convey speed) reach a stop state while they move along the helical engaging portion 11r (or tooth portion) of the control member 11, and are accordingly stopped comparatively moderately. In order to further enhance this effect, when stopping the cans 10, preferably, in the initial stage of the pivot operation, the driving unit 13 pivots the control member 11 at such a rotational speed that the cans 10 move at a speed almost equal to the convey speed by the conveyor 6, and after that stops the pivot operation (thus stopping the cans 10 as well) while gradually decreasing the rotational speed of the control member 11.

The timing at which the driving unit 13 pivots the driving unit 13 to stop the cans 10 by the control member 11 is controlled by the control unit 30 in accordance with the state of the timing screw 3. A sensor 35 can be formed to detect the rotation angle of, e.g., the timing screw 3. Information on the rotation angle of the timing screw 3 can be obtained when, e.g., the sensor 35 detects that a detection target portion (e.g., a mark or projection) 3m provided to a shaft 3s which rotates together with the timing screw 3 rotates into the detection region of the sensor 35. The rotation angle of the timing screw 3 indicates a direction around a rotation axis the detection target portion 3m as the reference position faces. As the rotation angle of the timing screw 3 determines the position of the engaging portion or tooth portion of the timing screw 3, the rotation angle is consequently information that specifies the positions of the cans 10. More specifically, the rotation angle of the timing screw 3 is correlated to the positions of the cans 10 which engage with the timing screw 3, as well as to the positions of all the cans 10 that are arranged tightly and continuously to follow the can 10 that engages with the most-upstream (inlet side) engaging portion of the timing screw 3.

Therefore, when the rotation angle of the timing screw 3 is detected, the positions of all the cans 10 that pass in front of the control member 11 can be recognized. Hence, according to this embodiment, the rotation angle of the timing screw 3 is detected by the sensor 35 and, on the basis of the detection result, the control unit 30 operates the driving unit 13 at a timing when the tooth portion (portion between the engaging portion and the engaging portion) of the control member 11 is inserted between the cans that are being conveyed continuously along the convey path, to pivot the control member 11. The control unit 30 includes a delay unit 31 which delays a detection signal of the detection target portion 3m provided by the sensor 35 to generate a driving signal. The delay unit 31 can adjust the delay time. By adjusting the delay time, the time delay since detection of the detection target portion 3m by the sensor 35 until pivot of the control member 11 can be adjusted. With the adjustable delay unit 31, the timing to drive the control member 11 can be easily adjusted, and the timing can be adjusted in accordance with the requirement of it. This adjustment can be performed while conveying, e.g., a test can.

The information indicating the state of the timing screw 3 can be obtained by, other than the above-described method of detecting the rotation angle, detecting the position of the engaging portion or the position of the tooth portion formed on the timing screw 3 by a sensor.

For example, the control unit 30 may feed-back control the driving unit 13 based on an output from a detection unit (e.g., a rotary encoder) 12 which detects the rotation angle of the control member 11.

As described above, with the structure of pivoting the control member 11 in accordance with the state, e.g., the rotation angle, of the timing screw 3 to stop the cans 10, the cans 10 can be stopped reliably. Since the helical engaging portion 11r is formed on the control member 11 and engaged with the cans 10 to control stop of the cans 10, slipping out of the cans from the control member 11 can be prevented and the cans 10 can be stopped more reliably. In addition, since the control member 11 is pivoted in accordance with the state, e.g., the rotation angle, of the timing screw 3 so that the tooth portion between the helical engaging portions 11r is inserted between the cans 10, damages or the like to the cans 10 which occur when the tooth portion bites into the trunk portions of the cans 10 can be prevented.

A bite detection sensor (e.g., a proximity sensor which detects that a can approaches a predetermined region) 38 may be arranged in the vicinity of the control member 11 to detect that the tooth portion of the control member 11 bites into the cans 10 due to an erroneous operation or the like. When a bite is detected, the control unit 30 produces an alarm or the like. When a bite occurs, supply of the cans 10 to the timing screw 3 is interfered with immediately by the control member 11. Thus, a can 10 that has experienced a bite is not supplied to the timing screw 3 at all, or if any, very rarely.

Regarding the timing to resume (start) supply of the cans 10 that has been stopped, the rotation angle of the rotating timing screw 3, or the position of the helical engaging portion on formed throughout the entire surface of the timing screw 3 must be considered. More specifically, the control member 11 should be driven such that when the control member 11 resumes (starts) conveyance of the cans 10 and the leading can 10 which has been stopped moves through the convey path to reach the timing screw 3, the helical tooth portion formed on the timing screw 3 will not bite into the leading can 10.

This embodiment includes a detection unit (e.g., a rotary encoder) 15 which detects the rotation angle of the timing screw 3 as the information on the position of the tooth portion of the timing screw 3. The control unit 30 controls the driving unit 13 based on the detection result of the detection unit 15, so that the cans 10 are supplied to the timing screw 3 at an appropriate timing. More specifically, on the basis of the detection result of the detection unit 15, the control member 11 is pivoted at an angle (that is, the state shown in FIG. 5) that does not interfere with the conveyance of the cans 10 by the conveyor 6, so that the cans 10 are supplied to the timing screw 3 at the appropriate timing. This control can be performed by considering parameters such as the distance between the timing screw 3 and control member 11, the convey speed of the conveyor 6, the rotational speed of the timing screw 3, the pivoting speed of the control member 11, the rotation angle of the control member when the cans 10 bound by the control member 11 are to be released (and a time required until the control member pivots through such a rotation angle), the delay of the control system, and the like.

Figure 7A:
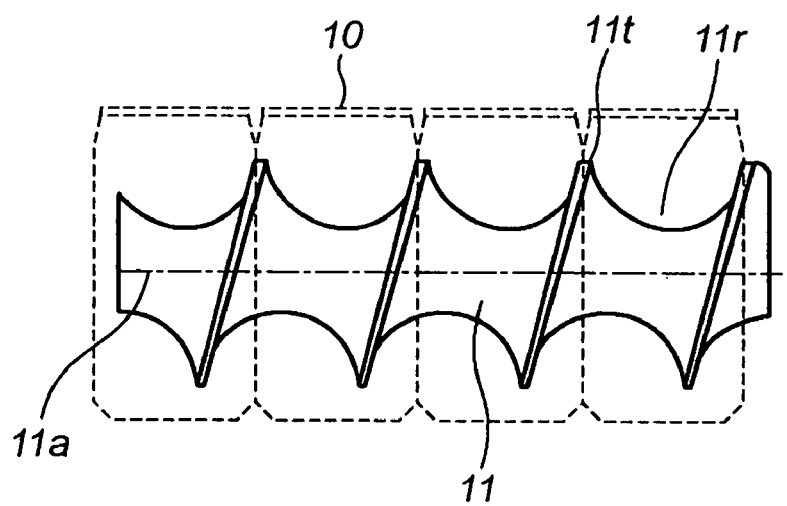
FIG. 7A is a view showing the structure of a control member which controls conveyance and stop of cans.
Figure 7B:
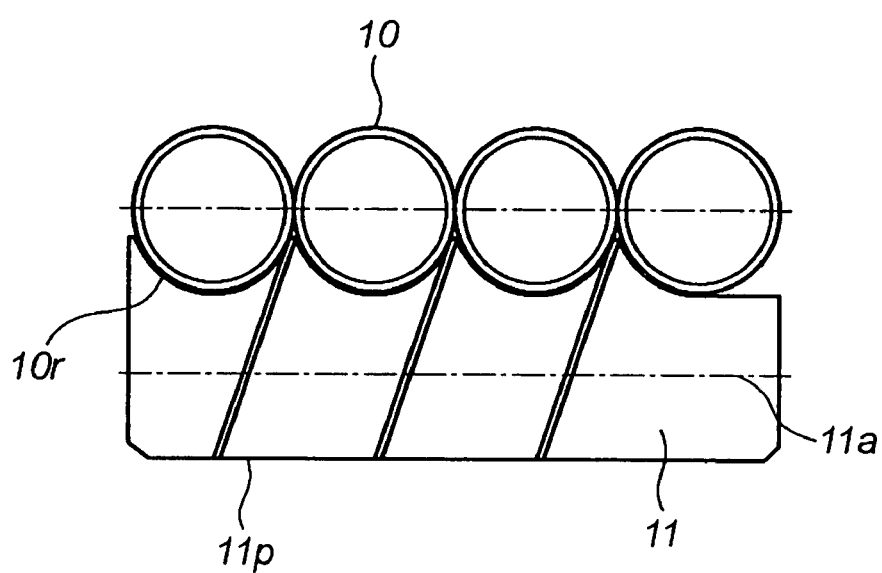
FIG. 7B is a view showing the structure of the control member which controls conveyance and stop of the cans.

An example of the preferred shape of the control member 11 to control the conveyance and stop of the cans will be described with reference to FIGS. 7A and 7B. FIGS. 7A and 7B are a side view and plan view, respectively, of the control member 11 when conveyance of the cans 10 is stopped. The control member 11 according to the preferred embodiment of the present invention is supported to be rotatable about a shaft 11a which is arranged parallel to the convey path of the cans 10. The control member 11 has, in part of its side surface (i.e., in part of its entire circumference), a helical engaging portion 11r (and a tooth portion 11t between engaging portions 11r) which are semicircularly recessed when seen in the section and, in another part of its side surface, substantially cylindrical or linear convey guide surfaces 11p.

Figure 8:
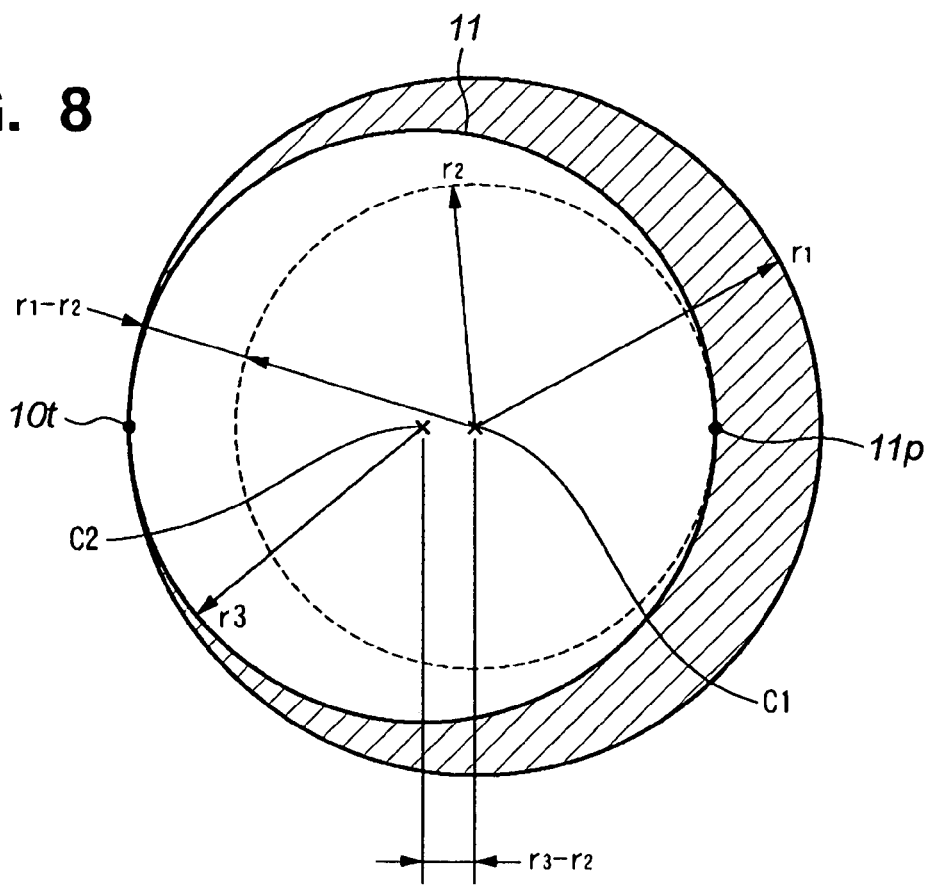
FIG. 8 is a view showing the structure of the control member which controls conveyance and stop of the cans.

FIG. 8 is a view showing the example of the preferred shape of the control member 11 from another point of view. FIG. 8 is a view of the control member 11 seen from infinity in its axial direction. For example, the control member 11 according to this embodiment has a shape obtained by forming, in a cylindrical member with a radius r1 and having a center line C1 as the center, an engaging portion having a depth (r1−r2) (preferably, an engaging portion recessed semicircularly in a section taken along a plane that crosses the center line C1) helically, and thereafter extracting, from the cylindrical member formed with the engaging portion, that portion in a cylindrical surface which has a radius r3 and a center line C2 shifted from the center line C1 as the center (that is, a shape obtained by removing the hatched portion from the cylindrical member formed with a groove). In this case, a substantially cylindrical or linear convey guide surface 11p is formed on the right in FIG. 8, and the engaging portion with the depth (r1 −r2) is formed on the left in FIG. 8. In the example shown in FIG. 8, the distance between the center lines C1 and C2 is (r3−r2), and a circle with a radius r1 and a circle with a radius r3 are in contact with each other on the left in FIG. 8.

According to the preferred embodiment of the present invention, for example, the control member 11 is rotationally or pivotally driven by the driving unit 13 about the center line C1 (a line shifted from the center line C2 of the control member 11) as a rotation center 11a.

Figure 9:
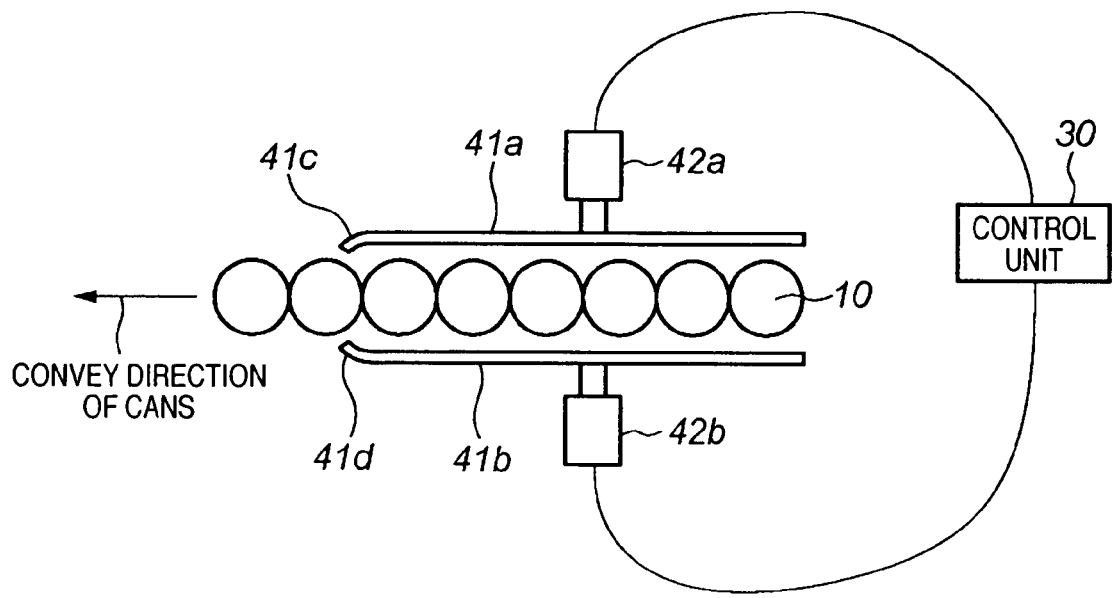
FIG. 9 is a view showing a control member and its peripheral arrangement according to another embodiment of the present invention.

FIG. 9 is a view showing the structure of a control member according to another embodiment that can be used in place of the above control member 11. The embodiment shown in FIG. 9 has a pair of control members 41a and 41b. The control members 41a and 41b sandwich the cans 10 from two sides to stop them. When the control members 41a and 41b are released, conveyance of the cans 10 by the conveyor 6 is permitted. The control members 41a and 41b are driven by driving units (e.g., air cylinders or linear motors) 42a and 42b corresponding to the driving unit 13 described above.

In response to a driving signal which is provided by the control unit 30, the driving units 42a and 42b drive the control members 41a and 41b at a timing that can reliably stop the cans 10 in accordance with the state of the timing screw 3 such as the rotation angle (consequently, the positions of the cans 10), to stop the cans 10, in the same manner as in the embodiment shown in FIGS. 5 and 6.

When conveyance of the cans 10 is to be resumed (started), the control unit 30 controls the control members 41a and 41b through the driving units 42a and 42b at such a timing that when the leading can 10 which has been stopped moves along the convey path to reach the timing screw 3, the helical tooth portion formed on the timing screw 3 will not bite into the can 10, so that the cans 10 which have been restricted by the control members 41a and 41b are released.

In the embodiment shown in FIG. 9, both of the pair of control members are driven. Alternatively, one control member may be fixed, and only the other control member may be driven.

Figure 10:
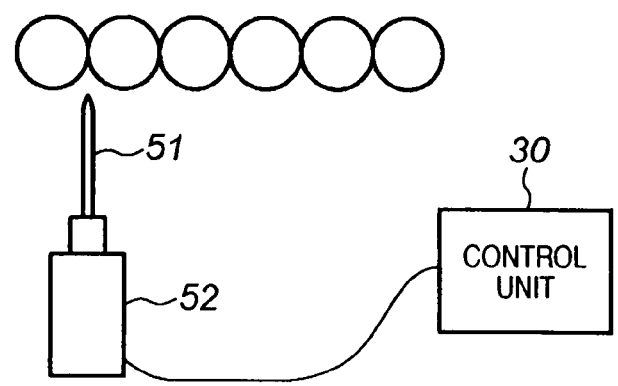
FIG. 10 is a view showing a control member and its peripheral arrangement according to still another embodiment of the present invention.

FIG. 10 is a view showing the structure of a control member according to still another embodiment which can be used in place of the control member 11 described above. The embodiment shown in FIG. 10 has a control member 51 which closes the convey path of the cans 10 to stop the cans 10, and opens the convey path to allow conveyance of the cans 10. The control member 51 is driven by a driving unit (e.g., an air cylinder or linear motor) 52 corresponding to the driving unit 13 described above.

In response to a driving signal which is provided by the control unit 30, the driving unit 52 drives the control member 51 at a timing that can reliably stop the cans 10 in accordance with the state of the timing screw 3 such as the rotation angle (consequently, the positions of the cans 10), to stop the cans 10, in the same manner as in the embodiment shown in FIGS. 5 and 6.

When conveyance of the cans 10 is to be resumed (started), the control unit 30 controls the control member 51 through the driving unit 52 at such a timing that when the leading can 10 which has been stopped moves along the convey path to reach the timing screw 3, the helical tooth portion formed on the timing screw 3 will not bite into the can 10, so that the cans 10 which have been bound by the control member 51 are released.

The invention claimed is:

1. A container control apparatus for controlling conveyance of containers, the apparatus comprising:
a control member to control supply and stop of containers continuously conveyed by a convey device along a convey path to a processing device which sequentially receives the containers by a rotatable timing screw having helically arranged engaging portions for engaging the containers;
wherein the control member is located on the convey path before said timing screw;
a detection unit which detects a rotational state of said timing screw;
said control member has a first side surface and a second side surface, the second side surface including helically arranged engaging portions for engaging the containers to stop the supply of containers; and
said control member is arranged to be pivoted by a driving unit, driven in accordance with the rotational state of the timing screw detected by said detection unit, about a central axis parallel to said convey path between a position in which the first side surface faces the convey path for permitting the supply of the containers on said convey path and a position in which the second side surface faces the convey path for stopping the supply of the containers on said convey path.

2. The container control apparatus according to claim 1, wherein said first side surface of the control member is not formed with members for engaging the containers thereby permitting the supply of the containers on said convey path.

3. The container control apparatus according to claim 1, wherein said processing device includes a filling device which fills the containers with a liquid.

4. The container control apparatus according to claim 1, wherein said detection unit detects a rotation angle of said timing screw.

5. The container control apparatus according to claim 1, wherein said detection unit detects, as information indicating a rotational state of said timing screw, information related to a position of a container engaging with one of said engaging portions of said timing screw, and a position of a container which moves beside said control member along said convey path is specified by the information.

6. The container control apparatus according to claim 1, wherein the containers which are conveyed continuously along said convey path continue tightly from a position of an inlet of said timing screw to said control member.

7. The container control apparatus according to claim 1, further comprising a delay unit which delays a detection signal from said detection unit to supply a driving signal to said driving unit, and said delay unit can adjust a time to delay the detection signal.

8. A manufacture-related plant which deals with containers, the plant comprising:
a processing device which has a timing screw formed with a helical engaging portion to receive the containers continuously conveyed by a convey device along a convey path;
a control member located on said convey path before said timing screw to control supply and stop of the containers to said timing screw of said processing device;
a detection unit which detects a rotational state of said timing screw;
said control member has a first side surface and a second side surface, the second side surface including helically arranged engaging portions for engaging the containers to stop the supply of containers; and
said control member is arranged to be pivoted by a driving unit, driven in accordance with the rotational state of the timing screw detected by said detection unit, about a central axis parallel to said convey path between a position in which the first side surface faces the convey path for permitting the supply of the containers on said convey path and a position in which the second side surface faces the convey path for stopping the supply of the containers on said convey path.

9. The manufacture-related plant according to claim 8, wherein said processing device includes a filling device which fills the containers with a liquid.

* * * * *